April 14, 1959
C. A. RUND
2,882,102
COUPLING LINK FOR A CRAWLER VEHICLE TRACK
AND CONTINUOUS TRACK USING SAME
Filed April 15, 1957
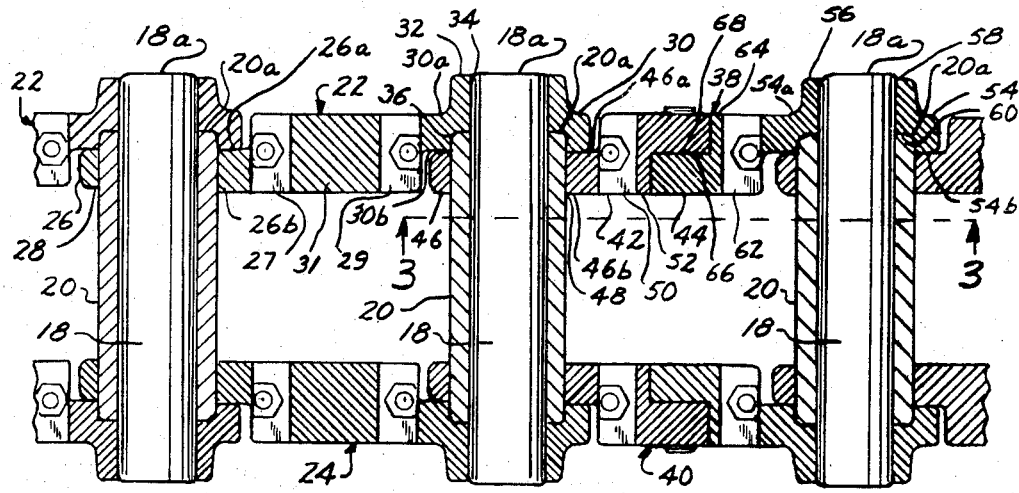
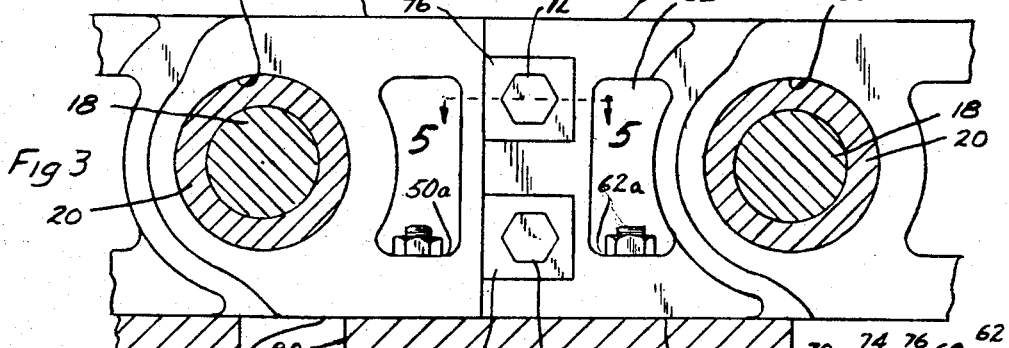
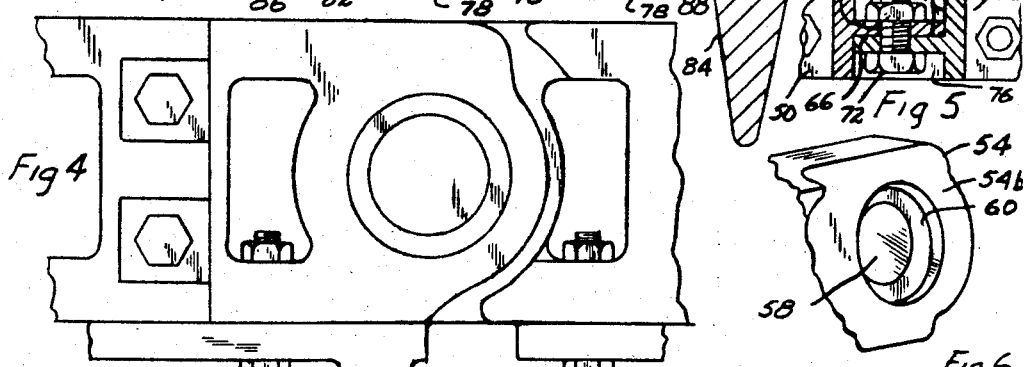
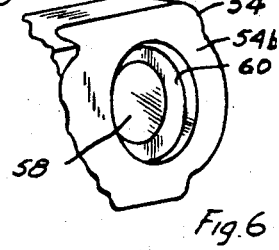
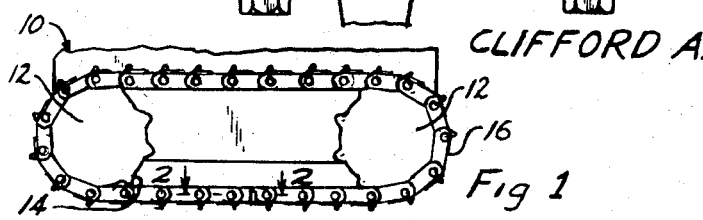
CLIFFORD A. RUND INVENTOR
BY Frost and Verhoeven
ATTORNEYS United States Patent Office 2,882,102
Patented Apr. 14, 1959

2,882,102

COUPLING LINK FOR A CRAWLER VEHICLE TRACK AND CONTINUOUS TRACK USING SAME

Clifford A. Rund, Marshall, Minn.

Application April 15, 1957, Serial No. 652,738

7 Claims. (Cl. 305—10)

My invention relates to a coupling link for a crawler vehicle track and a continuous crawler track coupled by said link.

The conventional crawler vehicle track consists of a plurality of parallel aligned pins, each rotatably received in a bushing and extending therefrom at each end. The pins are connected by pairs of links to define a continuous chain. Each link, at one end, is snugly received on a bushing and, at the other end, is snugly received on the adjacent pin, so that the links are securely held in position while, at the same time, adjacent links are rotatable in relation to each other to give the track the required flexibility. Grousers consisting of plates carrying ground gripping cleats are connected between the links of each pair to define a crawler track.

In such a flexible continuous crawler track the entry of dirt or other abrasive material into the bushing carrying the rotating pin causes excessive wear which results in premature failure of the track. For that reason, it is desirable to shield, as much as possible, the ends of the bushings. Generally, the link is designed so that the end which snugly receives the end of the pin extending from the bushing also rotatably receives the bushing end to shield it from dirt.

However, in conventional tracks, the master bushing which rotatably receives the master pin, which is the pin removed when the track is uncoupled, cannot extend into the ends of the pair of links with which the master pin is in engagement. If it did, disengagement of the pair of links from the bushing would be impossible and the track could not be uncoupled. For this reason the master bushing is generally shorter than the other bushings and hence is not shielded by the links from the entry of dirt. Because of this the master pin is subjected to considerably greater wear from abrasive material entering the ends of the bushing and failure of this part is common.

In conventional tracks, not only must the master pin assembly be specially constructed to permit disengagement of the links from the pin at each end, but the master pin must be driven out of engagement with the links before the track can be separated. On occasions this can be very difficult, especially when dirt or other matter has worked its way into the opening in the link which snugly receives the pin. Difficulty is also experienced in joining the track for installation particularly when it is necessary to install the track under an emergency condition.

In the present invention a coupling link is provided which eliminates the need for a specially designed master pin assembly. The link can be connected between pin assemblies which are identical to all the other pin assemblies in the track. Moreover the ends of this link may have the same conformations as the other links to provide shielding for the ends of the bushing and prevent dirt from entering the pin and bushing assembly. This link also permits a quick and easy method of separation of the track without the need of removing any of the pins.

In brief, the coupling link is constructed of two separable parts. One part, at one end, is snugly received on one of the bushings of the track. The other part, at one end, is snugly received on the adjacent pin. The bushing and pin which receive the parts of the link may be similar in every detail to the other bushings and pins of the continuous track. The opposite ends of the two parts have mating surfaces. When a pair of the coupling links are installed to join the track, the parts of each coupling link overlap with their mating surfaces in contact. The two parts of each link are detachably connected together to securely and rigidly join the track. Means are provided to detachably receive ground gripping means.

The end of the link which snugly receives the pin may have the same conformation as the other links and, therefore, may have a recess to rotatably receive the bushing in which the pin is received. Thus a continuous track is provided where dirt and other abrasive materials can be kept out of all the bushings by eliminating the special coupling assembly where frequent failures occur.

It is therefore a general object of the present invention to provide a continuous crawler vehicle track with all bushings shielded at the ends to prevent the introduction of dirt and other abrasive material.

It is another object of the present invention to provide a coupling link for a continuous crawler vehicle track which permits separation of the track without removal of any of the track pins.

It is still another object of the present invention to provide a readily separable track for a crawler vehicle having like pin assemblies.

It is a further object of the present invention to provide a coupling link for a continuous crawler vehicle track which permits easy and quick separation or coupling of the track without the need of special tools.

It is an additional object of the present invention to provide a coupling link which may be used on a variety of crawler vehicle tracks, including tracks originally designed for coupling by a master pin and bushing.

It is yet another object of the present invention to provide a separable coupling link for a crawler vehicle of simple rugged construction, inexpensive to manufacture, effective in operation, and adaptable for use on a wide variety of tracks.

The novel features which I believe to be characteristic of my invention are set forth with particularity in the appended claims. My invention itself, however, both as to its organization and method of operation, together with further objects and advantages thereof, will best be understood by reference to the following description taken in conjunction with the accompanying drawings, in which:

Figure 1 is a fragmentary elevational view of a crawler type vehicle with a continuous track installed thereon;

Figure 2 is a view through section 2—2 of Figure 1;

Figure 3 is a view through section 3—3 of Figure 2;

Figure 4 is a view through section 4—4 of Figure 2;

Figure 5 is a view through section 5—5 of Figure 3; and

Figure 6 is a fragmentary view in perspective of the end of one part of the coupling link which receives the pin, showing the recess which receives the end of the bushing.

As shown in Figure 1, a crawler vehicle 10 has two wheels 12 on one side of the vehicle with sprocket teeth 14 spaced circumferentially around the outer periphery of the wheels. The sprocket teeth 14 engage a continuous crawler track shown generally at 16 which encircles the wheels.

As shown best in Figures 2, the track 16 has a plurality of parallel aligned spaced pins 18, each rotatably received in a bushing 20, with the ends 18a of the pins extending from the ends 20a of the bushings. Each bushing 20 and the pin 18 it receives define a pin assembly which may be identical to every other pin assembly in the track. The pins are connected to be rotatable in relation to each other by pairs of links to define a continuous flexible chain. Each pair of links is made up of a right hand and a left hand link which are opposed, but similar, to each other. All of the pairs of links, except one, are similar to the pair comprising links 22 and 24 shown in Figure 2.

The link 22 consists of a body portion 31 and end portons 26 and 30. The end portion 26 has an outboard surface 26a, an inboard surface 26b, and opening 28 extending through the portion, normal to these surfaces, which snugly receives the bushing 20. The bushing 20 extends through the opening 28 so that the end 20a of the bushing protrudes beyond the outboard surface 26a of the portion 26. At the opposite end of the link 22 is the portion 30 which has an outboard surface 30a and an inboard surface 30b. The portion 30 is offset from the portion 26 so that the inboard surface 30b of portion 30 is in general alignment with the outboard surface 26a of portion 26. On the outboard surface 30a is a boss 32 with a centrally disposed opening 34 extending through the portion 30. The opening 34 snugly receives the end 18a of the pin 18. A recess 36 is cut in the inboard surface 30b of the portion 30, coaxial with the opening 34 and surrounding it, as shown in Figure 2. This recess is of a size to rotatably receive the end 20a of the bushing extending from the adjacent link. The link 22 has, between the portions 26 and 30, two openings 27 and 29 extending through the link in the body portion 31. The link 24 is similar but of reversed conformation to the link 22.

With the above described construction it will be noted that the pins connected by the links 22 and 24 are each rotatable in their respective bushings 20 and are rotatable in relation to each other. The ends of each bushing are received within the link and are thereby shielded from dirt and other foreign material. These harmful materials will not enter the pin assembly at the extreme ends of the pin since the pin is snugly received in the links.

The pair of coupling links consist of the links shown generally at 38 and 40 in Figure 2. Each of the links consists of two separable overlapping parts, the link 38 being made of parts 42 and 44. The part 42 has a portion 46 similar in every respect to the portion 26 of link 22. The portion 46 has an outboard surface 46a, an inboard surface 46b, and an opening 48 extending through the portion, normal to those surfaces, which snugly receives bushing 20. The end 20a of the bushing extends beyond the outboard surface 46a of the portion 46. The part 42 has a body portion 52 with an opening 50 extending therethrough. The opening 50 has a relatively flat surface 50a at its lower end as shown in Figure 3.

Part 44 has a portion 54 having outboard surface 54a and inboard surface 54b which is similar to the portion 30 of link 22. The portion 54 has a boss 56 on its outboard surface 54a with a centrally disposed opening 58. The end 18a extending from the bushing 20 is snugly received in opening 58. On its inboard surface 54b the portion 54 has a recess 60 coaxial with the opening 58 and surrounding it as shown in Figures 2 and 6. This recess rotatably receives the extending end 20a of bushing 20. It will be noted that this recess shields the bushing end and substantially lessens the possibility of any dirt working its way into the pin assembly. The part 44 also has a body portion 64 with an opening 62 extending therethrough and having a flat surface 62a at its lower end as shown in Figure 3.

The body portions 52 and 64 of the parts 42 and 44, respectively, have mating overlapping surfaces 66 and 68 where the parts 42 and 44 are joined as shown in Figure 2 and Figure 5. These surfaces may be scarfed to form complementary faces when joined. The surfaces are cut so that, when joined, the portion 54 of part 44 is offset from the portion 46 of part 42 with the inboard surface 54b of portion 54 in approximate alignment with the outboard surface 46a of portion 46. The body portions 52 and 64 have holes 70 which align with each other when the complementary mating surfaces are joined. The holes 70 receive bolts 72 which, with nut 74, detachably connect the mating parts 42 and 44. In the surfaces of the body portions 52 and 64 opposite the mating surfaces, recesses 76 surround the holes 70 to receive the head of the connecting bolt 72 and the nut 74.

The body portions 52 and 64 of parts 42 and 44 have holes (not shown) drilled from the relatively flat surfaces 50a and 62a in the openings 50 and 62 to the lower edges 86 and 88, respectively, of parts 42 and 44, which are in alignment. These holes receive bolts 78 which connect the ground-gripping means 80 to the lower edge of the link. The ground-gripping means 80, as shown, is a grouser having a plate 82 and a cleat 84. The grouser is detachably connected between the links of each pair of links on the track and can be easily removed from the coupling links when it is desired to uncouple the track. At the same time the grouser serves to hold the separable parts of the coupling links 38 and 40 rigidly together when the track is coupled and in use.

The link 40 is similar to the link 38 but reversed, as shown in Figure 2, and its construction will, for that reason, not be described in detail.

In the use of the track and coupling links disclosed herein the portion 46 of the part 42 snugly fits over the bushing 20 in the same manner as all the other links of the track. The portion 30 of an adjoining link is received over the end of the bushing and snugly engages the end 18a of the pin 18. The end 20a of the bushing is rotatably received within the recess 36 of the portion 30 to shield the end 20a of the bushing from the introduction of dirt or other abrasive material. The portion 54 of the part 44 snugly receives the end 18a of the adjacent pin 18 and receives within its recess 60 the end 20a of the adjacent bushing. This bushing 20 is therefore shielded from the introduction of dirt and other matter in the same manner as are all the bushings in the track. Since the ends 18a of all the pins are snugly received in their respective links, including the coupling links, dirt will not enter the bushing through this connection. It will be noted that none of the pin assemblies, including those adjacent to and straddling the coupling links, need be disassembled to uncouple the track.

The track is uncoupled merely by removing the bolts 72, which join the body portions of the links 38 and 40, and by removing the detachable ground gripping means 80. Because of the uniform construction of the pin assemblies throughout the track no weak spot exists. At the same time the track can be coupled and uncoupled with ease and without the necessity of special tools.

It should be noted that while the conformations of the coupling links at their ends where they connect to adjacent pin assemblies may be identical to the conformations of the other links of the chain, they need not be. The coupling links disclosed herein, for example, may be used in conjunction with a variety of crawler vehicle tracks including tracks originally designed for coupling with a master pin and bushing. In such case, the master pin and bushing may be removed from the track and the coupling links of the present invention inserted between any two adjacent pin assemblies.

While I have shown and described a specific embodiment of the present invention it will, of course, be understood that various modifications and alternative construction may be made without departing from the true spirit and scope thereof. I therefore intend by the appended claims to cover all such modifications and alternative construction as come within their true spirit and scope.

What I claim as new and desire to secure by Letters Patent of the United States is:

1. A coupling link for a continuous track for a crawler vehicle of the type having a plurality of pins each rotatably received in a bushing and extending therefrom at each end, each pin being connected to an adjacent bushing by a pair of links received, respectively, on the extending ends of the pin, said links carrying ground gripping means to define a crawler track, the coupling link comprising in combination: two overlapping parts together defining a single link with at least one of the edges of the respective parts aligned and adapted detachably to receive said ground gripping means, the overlapping ends of the parts having aligned holes and mating surfaces, one of said parts having an opening opposite its overlapping end to receive one of said bushings in close fitting relation and said other part having an opening opposite its overlapping end snugly to receive a pin in close fitting relation; and removable connecting means received through the aligned holes in the overlapping ends of the two parts detachably to connect the parts.

2. A coupling link for a continuous track for a crawler vehicle of the type having a plurality of pins each rotatably received in a bushing and extending therefrom at each end, each pin being connected to an adjacent bushing by a pair of links received, respectively, on the extending ends of the pin, the coupling link having two overlapping parts defining a single link, the parts having mating surfaces at their overlapping ends, one of said parts having an opening opposite its overlapping end to receive a bushing in close fitting relation and said other part having an opening opposite its overlapping end to receive a pin in close fitting relation, and removable connecting means detachably to connect the overlapping parts.

3. A coupling link for a continuous track for a crawler vehicle of the type having a plurality of pins each rotatably received in a bushing and extending therefrom at each end, each pin being connected to an adjacent bushing by a pair of links received, respectively, on the extending ends of the pin, said links carrying ground gripping means to define a crawler track, the coupling link comprising in combination: two overlapping parts together defining a single link, the overlapping ends of the parts having mating surfaces, one of said parts having an opening opposite its overlapping end snugly to receive one of said bushings in close fitting relation, and said other part having an opening opposite its overlapping end to receive a pin in close fitting relation and having a recess in one surface surrounding said opening to rotatably receive the end of the bushing in which said pin is received; and removable connecting means securing the overlapping parts rigidly together.

4. A coupling link for a continuous track for a crawler vehicle of the type having a plurality of pins each rotatably received in a bushing and extending therefrom at each end, each pin being connected to an adjacent bushing by a pair of links received, respectively, on the extending ends of the pin, the coupling link comprising in combination: two overlapping parts together defining a single link, the overlapping ends of the parts having aligned holes and complementary mating scarfed surfaces normal to said holes, the hole on at least one of said parts terminating in a recessed portion on the surface of said part opposite the mating surface, one of said parts having an opening opposite its overlapping end to receive one of said bushings in close fitting relation and said other part having an opening opposite its overlapping end to receive a pin in close fitting relation; and removable connecting means passing through the aligned holes and received within the recess on the surface of one of the parts.

5. A continuous track for a crawler vehicle comprising in combination: a plurality of parallel aligned pins; a bushing received on each pin and defining outboard exposed pin ends; pairs of links connecting the pins to form a closed chain, each link being received at one end on the exposed end of a pin and at the other end being received on a bushing so that as the vehicle proceeds rotation takes place between each bushing and the pin it receives, at least one pair of links being each of two-part construction having complementary mating faces located between the pin and bushing connected by said pair of links and having detachable means to hold the parts in snug fitted and hence immovable relation; and ground gripping plates extending between each pair of links and at least the plate extending between said one pair of links being detachably affixed to said pair of links.

6. A continuous track for a crawler vehicle comprising in combination: a plurality of parallel like aligned bushings; a plurality of like pins, each rotatably received in one of said bushings and extending therefrom at each end; pairs of links connecting the pins to form a closed chain, each link having an opening at one end to receive a bushing in close fitting relation and an opening at its opposite end to receive in close fitting relation the pin rotatably carried in the adjacent bushing, the latter opening having a recess to rotatably receive the end of the latter bushing whereby the end of said latter bushing is shielded to prevent the entry of abrasive matter into the bushing, at least one pair of links being each of two part construction having complementary mating faces located between the pin and bushing connected by said pair of links and having detachable means to hold the parts in snug rigid relationship.

7. A continuous track for a crawler vehicle comprising in combination: a plurality of parallel aligned pins; pairs of links connecting the pins to form a closed chain, the links being connected to the pins to be rotatable in relation to the links of the adjacent pairs of links, at least one pair of links being each formed of two separable parts having mating faces located between the pins connected by said pair of links, and having detachable means to hold the parts in snug fitted relationship; and ground gripping plates extending between the links of some of the pairs of links including said pair of links formed of separable parts, and at least the plate extending between the links of said pair being detachably affixed to the links.

References Cited in the file of this patent

UNITED STATES PATENTS

| 1,958,139 | Gammeter | May 8, 1934 |
| 2,517,429 | Henning | Aug. 1, 1950 |
| 2,621,981 | Schick | Dec. 18, 1952 |

FOREIGN PATENTS

| 344,110 | Germany | Jan. 18, 1920 |
| 584,173 | Great Britain | Jan. 8, 1947 |
| 709,739 | Great Britain | June 2, 1951 |